United States Patent [19]
Aelion et al.

[11] 3,854,982
[45] Dec. 17, 1974

[54] METHOD FOR PREPARING HYDROPHILIC POLYMER GRAFTS INCLUDING IRRADIATION

[75] Inventors: Rene Aelion, Concord; Edward Ferezy, Merrick, both of Mass.

[73] Assignee: Hydroplastics, Inc., New York, N.Y.

[22] Filed: May 12, 1972

[21] Appl. No.: 252,622

[52] U.S. Cl.......... 117/68, 117/93.31, 117/138.8 A, 117/161 UC, 117/161 UZ, 204/159.22, 117/124 E
[51] Int. Cl. ............................ B44d 1/50, C08f 3/50
[58] Field of Search.... 117/93.31, 161 UC, 161 UZ, 117/68; 204/159.22; 260/901

[56] References Cited
UNITED STATES PATENTS
3,520,949   7/1970   Sheperd et al. ............. 117/161 UC
3,531,547   9/1970   Hazen et al...................... 117/93.31
3,546,002   12/1970  Radlove et al................... 117/93.31

*Primary Examiner*—William D. Martin
*Assistant Examiner*—John H. Newsome
*Attorney, Agent, or Firm*—Stephen B. Judlowe

[57] ABSTRACT

Hydrophilic polymers are formed in situ by irradiating a mixture of hydroxyalkyl methacrylate and a cross linking agent. The former polymer is optically clear and free of voids, obviating the discoloration and discontinuity deficiencies characterizing prior art polymerization employing foreign substances such as solvents, dispersing agents, catalysts and the like. In accordance with one aspect of the present invention, the hydrophilic polymer may be formed as a coating on a glass, plastic or other substrate.

3 Claims, No Drawings

METHOD FOR PREPARING HYDROPHILIC POLYMER GRAFTS INCLUDING IRRADIATION

DISCLOSURE OF INVENTION

This invention relates to plastic polymerization and, more specifically, to a process employing high energy irradiation for forming hydrophilic polymers in situ.

Hydrophilic plastics — i.e., plastics having the property of absorbing and retaining water, have been the subject of much technical interest, as for contact lens utility among others. The hydrophilic devices have typically been formed of hydrophilic monomers combined with water soluble peroxides and cross linking agents. The soft gel hydrophilic plastic is formed by an exothermic reaction and exhibits disadvantages when intended for an optical end use. Thus, for example, the heat liberated during polymerization causes local boiling and bubbling of the water solvent, often resulting in nonhomogeneous properties in the formed article which is thus not optically clear. Then also, foreign matter such as catalyst and reaction decomposition products give rise to discoloration. Further, after polymerization, the residual water must be carefully removed by a very prolonged drying operation, under vacuum, to form a hard gel without causing cracks or bubbles — a tedious and difficult undertaking. The prior art molds must be made sufficiently strong to withstand the vacuum drying process.

Also, it is observed that the hard gel formed by the prior art processing is typically machined to its finished form. The reagents cannot simply be poured into a mold corresponding to the finished article form since there is marked thermal expansion and contraction caused by the exothermic reaction and subsequent cooling, and also because matter in the mold — such as the water solvent, must be removed.

It is therefore an object of the present invention to provide an improved process for forming hydrophilic articles.

More specifically, an object of this invention is the provision of a process for forming optically satisfactory hydrophilic articles from monomers directly, wherein dimensionally stable end product is directly obtained without discoloration and without discontinuities.

It is another object of the present invention to provide a hydrophilic coating grafted onto a glass, plastic or other substrate.

The above and other objects, features and advantages of the present invention are realized in a specific, illustrative method for forming hydrophilic hard gel polymers in situ, and in a single operation. A hydrophilic monomer system — including only the monomers, is placed in a suitably formed die or mold cavity. The monomer system includes one or more hydroxyalkyl methacrylates, and a di- or polyunsaturated cross linking agent such as dimethacrylate.

The monomer system is then polymerized, with cross linking, by high energy particule irradiation, as by accelerated electrons or nuclear particles such as protons, neutrons, alpha, beta and/or gamma particles. These particles may be obtained directly from radio active materials, or via a voltage gradient accelerator.

The finished product prepared by the above process has superior optical properties vis-a-vis those formed by prior art methodology. Thus, product formed by the instant invention exhibits water affinity without discoloration, voids and other nonhomogeneous faults, and which may be molded into its finished shape.

The following examples further illustrate the principles of the present invention.

EXAMPLE I

A mixture of 95 parts by weight of 2 hydroxyethyl methacrylate (herein: HEMA) and 1.5 parts of a dimethacrylate (herein: DMA) at 0°C were placed in a tube which was sealed under vacuum. The tube was irradiated by a Cobalt 60 source in a field of 0.05 mrad/hr to a dose of 0.2 mrad ($2\times10^5$ rads). An optically clear gel was formed which could be directly machined into a lens, by conventional machining procedures and without special treatment.

EXAMPLE II

The monomer system, as in Example I, was employed (but at 25°C), and exposed to 1.1 mrads in a 0.1 mrad/hr field to produce an optically pure, clean, and otherwise satisfactory lens material free of bubbles or other faults.

The hydrophilic polymer was formed into a disc 2 1/16 inches in diameter and 3/16 inch thick, and weighed 13.25 grams. After water immersion for 3 days, the disc diameter and thickness had increased to 2 3/8 inches and 1/4 inch. At saturation, the disc weight had increased to 20.00 grams.

It is a further feature of the present invention that hydroplastic materials prepared by the present invention exhibit improved scratch and mar resistance when compared with even conventional hard plastic polymethylmethacrylate (PMMA) lenses. The lens (HEMA) of the present invention prepared as in Example II — both dry and water immersed for 24 hours, and a PMMA lens were both submitted to the abrading action of 25 grams, and 100 grams, of carborundum powder, following the procedures described in ASTM D-673-70 and D-1003. The haze of the samples was measured before and after abrasion, and the results are summarized in the table below:

TABLE

| Sample | Percent Haze Increase | |
|---|---|---|
| | 25 grams | 100 grams |
| HEMA (dry) | 1.7 | 9.5 |
| HEMA (conditioned) | 1.2 | 11 |
| PMMA | 7.8 | 30 |

EXAMPLE III

The monomer system of Example II was polymerized by exposure to a dose of .078 mrad in a field of 0.03 mrad/hr, and a subsequent dose of 0.82 mrad in a field of 0.05 mrad/hr. The material so formed was optically clean and satisfactory, and exhibited a water absorption capacity of 30%.

The two step irradiation procedure was above illustrated has been found to speed up polymerization. That is, the monomers are partially cured in a relatively low field to keep the monomer temperature rise relatively low (and thus prevent cracking and the like). The requisite polymerization dose may then be completed in a high amplitude field. Thus, for example, first and second fields of 0.01 mrad/hr and 0.1 mrad/hr have been successfully employed.

EXAMPLE IV

A mixture of 96 parts by weight of hydroxypropyl methacrylate and one part of a dimethacrylate at 25°C were placed in a mold. The mold was irradiated under vacuum from a Cobalt 60 source of a field of 0.1 mrad/hr to a dose of 0.32 mrad. A rigid, optically clear hydrophilic lens was formed.

The above discussion has considered the situation where an entire article was formed of a hydrophilic polymer. In accordance with the further principles of the present invention, it has been discovered that an optically pure coating may be grafted by irradiation onto a substrate such as glass, a cross linked plastic, or the like. The hydrophilic material thus provides its desirable properties — e.g., water absorption while the substrate provides form definition, rigidity and the like. Thus, the hydrophilic-glass combination provides optical transmission which is fog-free, surface fluid being absorbed as required by the hydrophilic layer.

As noted by the examples below, the hydrophilic-substrate structure may be fabricated without discoloration, faults or the like by dipping the substrate into a monomer system, and curing the monomer by irradiation. The cured hydrophilic plastic rigidly adheres and is grafted onto the substrate while providing all benefits above discussed.

EXAMPLE V

A coating monomer bath system of 95 parts HEMA by weight and 1.5 parts DMA was prepared, and lowered in temperature to 0°C to increase viscosity. Glass lenses were dipped in the bath and placed in a cylindrical glass container which was sealed and evacuated.

The glass container was exposed to a Cobalt 60 source of field strength 0.166 mrad/hr to a dose of 0.5 mrad.

The resulting coated glass provided a relatively soft, water absorptive surface for complete fog elimination — both great safety features. In particular, the hydrophilic coating where tested by immersion in water absorbed 53% of its weight in water.

EXAMPLE VI

A methacrylate lens was coated with the HEMA-DMA monomer system of Example V at 25°C, the irradiation dose being 0.2 mrad in a field of 0.1 mrad/hr.

The resulting product had an 80 micron thick hydrophilic coating (6.1% hydrophilic by weight), and exhibited visibly detectable anti-fogging properties. The product absorbed 42% of the hydrophilic weight of water when immersed.

EXAMPLE VII

A glass lens was coated with the HEMA-DMA monomer system of Example V, at 25°C. The hydrophilic coating was 4.5% by weight of the end product; provided an anti-fogging effect; and absorbed 36% of the hydrophilic weight when immersed.

EXAMPLE VIII

A glass lens was coated as in Example VII, and exposed to a dose of 1.05 mrad in a 0.05 mrad/hr field. The hydrophilic coating was 2.4% by weight of the end product, and provided an anti-fogging property.

In accordance with a yet further aspect of the present invention, a very hard coating may be applied to a substrate, as on the surface remote from the hydrophilic coating.

EXAMPLE IX

A stack of polymethacrylate lenses is dipped into a bath of diethylene glycol bis allyl dicarbonate. The lenses were placed in a sealed glass container under vacuum, and irradiated to a dose of 20 mrad to polymerize and cross link the dicarbonate monomer coating. The mar resistance of the coated lenses was then measured following ASTM D-673-70, and compared to uncoated lenses. While 10 grams of Emery particles were enough to create a 10% haze for the uncoated lenses, 300 grams were necessary to reach the same level with the coated lens.

EXAMPLE X

As noted above with respect to Example IX, coating with the allyl dicarbonate requires a relatively high dose (about 15 mrads) to complete polymerization. A small amount of cross linking agent such as diethylene glycol, dimethacrylate or methylolacrylamide increases the rate of polymerization, but yields an optically cloudy product. We have found that allyl acrylate, added to the allyl dicarbonate monomer as a cross linking agent accelerates polymerization and produces a glass-clear product. Addition of 1% of allyl acrylate to diethylene glycol bis allyl dicarbonate permits complete polymerization by a fraction of a megarad.

By way of specific example, glass coating with the above described solution including 1% allyl acrylate cross linking agent was completely effected with a dose of 1.5 mrads in a field of 0.1 mrad/hr at 25°C.

EXAMPLE XI

The monomer baths of Examples V and IX were sequentially applied by lens immersion to opposite surfaces of a methacrylate lens, one lens surface being alternately isolated from the bath by a polyethylene liner. The lenses were irradiated to 1.0 mrad in a field of 0.05 mrad/hr, getting a further dose of 9.6 mrad at 0.1 mrad/hr.

The resulting lens had one hard, scratch resistant surface, and an opposite, hydrophilic surface. Such a sandwich coating has many advantages—e.g., as an automobile windshield.

The above-described process and products are merely illustrative of the principles of the present invention. Numerous modifications and adaptations thereof will be readily apparent to those skilled in the art without departing from the spirit and scope of the present invention.

What is claimed is:

1. A process for forming a hydrophilic polymeric surface on a substrate comprising coating a first surface of said substrate with a first monomer system comprising a hydroxyalkyl methacrylate and a crosslinking agent, coating a second surface of said substrate with a second monomer system then irradiating said coated substrate with high energy radiation whereby said first monomer system is grafted onto said substrate and forms a hydrophilic surface.

2. A process as in claim 1 wherein said second monomer system comprises diethylene glycol bis allyl dicarbonate.

3. A process as in claim 1, wherein said second monomer system further comprises allyl acrylate as a cross-linking agent.

* * * * *